(12) United States Patent
Robl et al.

(10) Patent No.: US 8,684,623 B2
(45) Date of Patent: Apr. 1, 2014

(54) TOOL COUPLER HAVING ANTI-RELEASE MECHANISM

(75) Inventors: Troy Curtis Robl, Manhattan, KS (US); Andy Lee Vering, Manhattan, KS (US); Richard Kent Oswald, Onaga, KS (US); Trent Randall Stefek, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 13/483,903

(22) Filed: May 30, 2012

(65) Prior Publication Data

US 2013/0322959 A1 Dec. 5, 2013

(51) Int. Cl.
*E02F 3/96* (2006.01)

(52) U.S. Cl.
USPC ........... 403/322.3; 403/327; 414/723; 37/468

(58) Field of Classification Search
USPC ........ 403/316, 319, 322.3, 330, 325–327, 31; 414/723; 37/468
See application file for complete search history.

(56) References Cited

U.S. PATENT DOCUMENTS

| | | | |
|---|---|---|---|
| 3,556,323 A | 1/1971 | Heimmermann | |
| 4,214,840 A | 7/1980 | Beales | |
| 4,295,287 A | 10/1981 | Natzke et al. | |
| 4,373,852 A | 2/1983 | Maurer | |
| 4,417,844 A | 11/1983 | de Pingon | |
| 4,480,955 A | 11/1984 | Andrews et al. | |
| 4,625,988 A | 12/1986 | Witchey et al. | |
| 4,632,595 A | 12/1986 | Schaeff | |
| 4,643,631 A | 2/1987 | Maurer et al. | |
| 4,779,364 A | 10/1988 | Holmdal | |
| 4,790,084 A | 12/1988 | Anderson et al. | |
| 4,845,867 A | 7/1989 | Albrecht | |
| 4,846,624 A | 7/1989 | Hohn | |
| 4,854,813 A | 8/1989 | Degeeter et al. | |
| 4,881,867 A | 11/1989 | Essex et al. | |

(Continued)

FOREIGN PATENT DOCUMENTS

| | | |
|---|---|---|
| EP | 1318242 | 6/2003 |
| JP | 09209391 | 8/1997 |

(Continued)

OTHER PUBLICATIONS

U.S. Patent Application of Troy Curtis Robl et al. entitled "Tool Coupler System Having Multiple Pressure Sources" filed May 30, 2012.

(Continued)

*Primary Examiner* — Joshua Kennedy
(74) *Attorney, Agent, or Firm* — Finnegan, Henderson, Farabow, Garrett & Dunner LLP

(57) ABSTRACT

A tool coupler for a machine is provided herein. In an embodiment, the tool coupler may have a coupler frame, a hook coupled to the coupler frame and configured to receive a first pin of a tool, and a wedge operatively connected to the coupler frame. The tool coupler may also have an actuator connected to move the wedge away from the hook to bias a second pin of the tool against the coupler frame, and a latch associated with the wedge. The latch may be movable between a first position at which the wedge is allowed to move away from the second pin, and a second position at which the wedge is constrained from moving away from the second pin.

8 Claims, 5 Drawing Sheets

(56) References Cited

U.S. PATENT DOCUMENTS

| | | | |
|---|---|---|---|
| 4,906,161 | A | 3/1990 | Weyer |
| 4,955,779 | A | 9/1990 | Knackstedt |
| 4,958,981 | A | 9/1990 | Uchihashi |
| 5,010,962 | A | 4/1991 | Bloom, Jr. |
| 5,024,010 | A | 6/1991 | Huldén |
| 5,082,389 | A | 1/1992 | Balemi |
| 5,107,610 | A | 4/1992 | Fusco |
| 5,108,252 | A | 4/1992 | Gilmore, Jr. et al. |
| 5,110,254 | A | 5/1992 | Aubrey |
| 5,125,788 | A | 6/1992 | Stenger |
| 5,141,385 | A | 8/1992 | Tibbatts et al. |
| 5,145,313 | A | 9/1992 | Weyer |
| 5,147,173 | A | 9/1992 | Fauber et al. |
| 5,179,794 | A | 1/1993 | Ballinger |
| 5,195,865 | A | 3/1993 | Koehl |
| 5,222,695 | A | 6/1993 | Lake |
| 5,237,762 | A | 8/1993 | Sandberg |
| 5,242,258 | A | 9/1993 | Weyer |
| 5,256,026 | A | 10/1993 | Kishi |
| 5,324,162 | A | 6/1994 | Kishi |
| 5,332,353 | A | 7/1994 | Arnold |
| 5,333,400 | A | 8/1994 | Sonerud |
| 5,333,695 | A | 8/1994 | Walter |
| 5,350,250 | A | 9/1994 | Nagler |
| 5,360,313 | A | 11/1994 | Gilmore, Jr. et al. |
| 5,382,110 | A | 1/1995 | Perotto et al. |
| 5,394,630 | A | 3/1995 | Moinat |
| 5,400,531 | A | 3/1995 | Brown |
| 5,415,235 | A | 5/1995 | Gebauer |
| 5,423,625 | A | 6/1995 | Gebauer et al. |
| 5,431,528 | A | 7/1995 | Jenkins et al. |
| 5,456,030 | A | 10/1995 | Barone et al. |
| 5,465,513 | A | 11/1995 | Sonerud |
| 5,467,542 | A | 11/1995 | Hulden |
| 5,484,250 | A | 1/1996 | Gilmore, Jr. et al. |
| 5,487,230 | A | 1/1996 | Weyer |
| 5,494,396 | A | 2/1996 | Geier et al. |
| 5,515,626 | A | 5/1996 | Hölscher |
| 5,546,683 | A | 8/1996 | Clark |
| 5,549,440 | A | 8/1996 | Cholakon et al. |
| 5,575,093 | A | 11/1996 | Pratt et al. |
| 5,581,917 | A | 12/1996 | Barden |
| 5,584,644 | A | 12/1996 | Droegemueller |
| 5,597,283 | A | 1/1997 | Jones |
| 5,611,158 | A | 3/1997 | Pratt et al. |
| 5,618,157 | A | 4/1997 | Pratt et al. |
| 5,621,987 | A | 4/1997 | Pratt et al. |
| 5,634,735 | A | 6/1997 | Horton et al. |
| 5,634,736 | A | 6/1997 | Brown et al. |
| 5,642,785 | A | 7/1997 | Dam-Rasmussen |
| 5,685,689 | A | 11/1997 | Schneider et al. |
| 5,692,325 | A | 12/1997 | Kuzutani |
| 5,692,850 | A | 12/1997 | Kimble et al. |
| 5,692,852 | A | 12/1997 | Collins |
| 5,727,342 | A | 3/1998 | Horton |
| 5,779,429 | A | 7/1998 | Poole |
| 5,791,863 | A | 8/1998 | Droegemueller |
| 5,802,753 | A | 9/1998 | Raunisto |
| 5,813,822 | A | 9/1998 | Pisco |
| 5,820,332 | A | 10/1998 | Philips et al. |
| 5,865,594 | A | 2/1999 | Kim |
| 5,890,871 | A | 4/1999 | Woerman |
| 5,915,837 | A | 6/1999 | Brown et al. |
| 5,951,192 | A | 9/1999 | Collins |
| 5,966,850 | A | 10/1999 | Horton |
| 5,974,706 | A | 11/1999 | Kaczmarski et al. |
| 5,983,535 | A | 11/1999 | Kaczmarski et al. |
| 6,000,154 | A | 12/1999 | Berard et al. |
| 6,042,295 | A | 3/2000 | Barden |
| 6,058,633 | A | 5/2000 | Barden |
| 6,074,120 | A | 6/2000 | Williams |
| 6,088,393 | A | 7/2000 | Knee et al. |
| 6,088,938 | A | 7/2000 | Logan |
| 6,088,939 | A | 7/2000 | Logan |
| 6,108,951 | A | 8/2000 | Renfrow et al. |
| 6,123,501 | A | 9/2000 | Pisco |
| 6,132,130 | A | 10/2000 | McCann |
| 6,132,131 | A | 10/2000 | Nakamura et al. |
| 6,139,212 | A | 10/2000 | Heiple |
| 6,154,989 | A | 12/2000 | Kaczmarski et al. |
| 6,158,950 | A | 12/2000 | Wilt et al. |
| 6,163,988 | A | 12/2000 | Pratt et al. |
| 6,163,989 | A | 12/2000 | Kaczmarski et al. |
| 6,168,369 | B1 | 1/2001 | Bright et al. |
| 6,196,595 | B1 | 3/2001 | Sonerud |
| 6,202,331 | B1 | 3/2001 | Kobayashi |
| D440,983 | S | 4/2001 | Miller et al. |
| 6,227,792 | B1 | 5/2001 | Baker et al. |
| 6,231,296 | B1 | 5/2001 | Blomgren |
| 6,233,852 | B1 | 5/2001 | Pemberton |
| 6,241,455 | B1 | 6/2001 | Schupback et al. |
| 6,254,331 | B1 | 7/2001 | Pisco et al. |
| 6,260,357 | B1 | 7/2001 | Goodfellow et al. |
| RE37,320 | E | 8/2001 | Horton |
| RE37,339 | E | 8/2001 | Horton |
| 6,301,811 | B1 | 10/2001 | Gilmore, Jr. |
| 6,302,611 | B1 | 10/2001 | De Gier et al. |
| 6,305,106 | B1 | 10/2001 | McLellan |
| 6,308,442 | B1 | 10/2001 | Naka et al. |
| 6,312,212 | B1 | 11/2001 | Burlew, Jr. |
| 6,332,732 | B1 | 12/2001 | Mantovani |
| 6,332,747 | B1 | 12/2001 | Lee |
| 6,336,785 | B1 | 1/2002 | Kunzman |
| 6,350,079 | B1 | 2/2002 | Williams |
| D455,762 | S | 4/2002 | Kaczmarski et al. |
| 6,364,561 | B1 | 4/2002 | Droegemueller |
| 6,379,075 | B1 | 4/2002 | Shamblin et al. |
| 6,385,872 | B1 | 5/2002 | Mieger et al. |
| 6,386,822 | B1 | 5/2002 | Burr |
| 6,408,875 | B1 | 6/2002 | Nishikawa et al. |
| 6,422,805 | B1 | 7/2002 | Miller |
| 6,428,265 | B1 | 8/2002 | Gilmore, Jr. |
| 6,431,785 | B1 | 8/2002 | Melander |
| 6,438,875 | B1 | 8/2002 | Kimble et al. |
| 6,481,124 | B1 | 11/2002 | Miller et al. |
| 6,487,800 | B1 | 12/2002 | Evans et al. |
| 6,493,967 | B2 | 12/2002 | Holmes et al. |
| 6,499,904 | B2 | 12/2002 | Nye |
| 6,508,616 | B2 | 1/2003 | Hung |
| 6,513,266 | B1 | 2/2003 | Ijiri |
| 6,513,268 | B2 | 2/2003 | Lee et al. |
| 6,533,528 | B2 | 3/2003 | Degen et al. |
| 6,533,529 | B2 | 3/2003 | Waggoner |
| 6,539,650 | B2 | 4/2003 | Kaczmarski et al. |
| 6,606,805 | B2 | 8/2003 | Kimble et al. |
| 6,615,514 | B2 | 9/2003 | Ruiz |
| 6,625,909 | B1 | 9/2003 | Miller et al. |
| 6,629,811 | B1 | 10/2003 | Husson |
| 6,644,885 | B2 | 11/2003 | Dam-Rasmussen |
| 6,655,053 | B1 | 12/2003 | Cummungs |
| 6,658,770 | B2 | 12/2003 | Heiple |
| 6,659,708 | B2 | 12/2003 | Heiple |
| 6,659,709 | B1 | 12/2003 | Anderson |
| 6,688,801 | B2 | 2/2004 | Husson |
| 6,691,438 | B2 | 2/2004 | Fatemi |
| 6,699,001 | B2 | 3/2004 | Fatemi |
| 6,709,224 | B2 | 3/2004 | Heiple |
| 6,718,663 | B1 | 4/2004 | Geraghty |
| 6,725,584 | B2 | 4/2004 | Inoue et al. |
| 6,811,371 | B2 | 11/2004 | Mantovani |
| 6,812,851 | B1 | 11/2004 | Dukach et al. |
| 6,813,851 | B2 | 11/2004 | Mieger et al. |
| 6,857,842 | B2 | 2/2005 | Heiple |
| 6,877,259 | B2 | 4/2005 | Nishimura et al. |
| 6,881,002 | B2 | 4/2005 | Fatemi |
| 6,886,279 | B2 | 5/2005 | Kimble |
| 6,899,509 | B2 | 5/2005 | Mailleux |
| 6,902,346 | B2 | 6/2005 | Steig, Jr. et al. |
| 6,922,926 | B2 | 8/2005 | Miller et al. |
| 6,964,122 | B2 * | 11/2005 | Cunningham et al. .......... 37/468 |
| 7,047,866 | B2 | 5/2006 | Fatemi et al. |
| 7,306,395 | B2 * | 12/2007 | Fatemi ......................... 403/321 |
| 7,367,256 | B2 | 5/2008 | Fatemi et al. |
| 7,426,796 | B2 | 9/2008 | Cunningham et al. |

(56) References Cited

U.S. PATENT DOCUMENTS

| | | |
|---|---|---|
| 7,430,955 B2 | 10/2008 | Bitter |
| 7,455,494 B2 | 11/2008 | Krieger |
| 7,648,305 B2 | 1/2010 | Beales |
| 7,654,019 B2 | 2/2010 | Yeager et al. |
| 7,797,862 B2 | 9/2010 | Daraie et al. |
| 7,828,070 B2 | 11/2010 | Calvert et al. |
| 7,984,575 B2 | 7/2011 | Robl et al. |
| 8,011,121 B2 * | 9/2011 | Daraie et al. .................... 37/468 |
| 8,151,494 B2 * | 4/2012 | Scheib et al. .................... 37/468 |
| 8,262,310 B2 * | 9/2012 | Sikorski et al. ............ 403/322.3 |
| 8,281,506 B2 | 10/2012 | Stefek et al. |
| 2001/0026729 A1 | 10/2001 | Trowbridge |
| 2001/0053323 A1 | 12/2001 | Godwin et al. |
| 2002/0066215 A1 | 6/2002 | Kaczmarski et al. |
| 2002/0071754 A1 | 6/2002 | Fatemi |
| 2002/0098032 A1 | 7/2002 | Nye |
| 2002/0136597 A1 | 9/2002 | Nishikawa et al. |
| 2002/0157286 A1 | 10/2002 | Fatemi |
| 2002/0157287 A1 | 10/2002 | Mieger et al. |
| 2002/0170211 A1 | 11/2002 | Lee et al. |
| 2002/0174575 A1 | 11/2002 | Inoue et al. |
| 2002/0176772 A1 | 11/2002 | Hung |
| 2002/0178625 A1 | 12/2002 | Kimble et al. |
| 2003/0005605 A1 | 1/2003 | Kaczmarski et al. |
| 2003/0095858 A1 | 5/2003 | Mantovani |
| 2003/0099507 A1 | 5/2003 | Fatemi |
| 2003/0103806 A1 | 6/2003 | Short |
| 2003/0131505 A1 | 7/2003 | Heiple |
| 2003/0133779 A1 | 7/2003 | Heiple |
| 2003/0154636 A1 | 8/2003 | Miller et al. |
| 2003/0175072 A1 | 9/2003 | Steig, Jr. et al. |
| 2003/0204972 A1 | 11/2003 | Cunningham et al. |
| 2003/0233773 A1 | 12/2003 | Mieger et al. |
| 2004/0000077 A1 | 1/2004 | Fatemi |
| 2004/0028515 A1 | 2/2004 | Martin |
| 2004/0057784 A1 | 3/2004 | Geraghty |
| 2004/0076504 A1 | 4/2004 | Geraghty |
| 2004/0165979 A1 | 8/2004 | Fatemi |
| 2004/0184875 A1 | 9/2004 | Mieger et al. |
| 2004/0218971 A1 | 11/2004 | Lim et al. |
| 2004/0247382 A1 | 12/2004 | Leemans et al. |
| 2005/0169703 A1 | 8/2005 | Fatemi |
| 2005/0204591 A1 | 9/2005 | Mieger et al. |
| 2005/0214105 A1 | 9/2005 | Steig, Jr. et al. |
| 2007/0166143 A1 | 7/2007 | Hart et al. |
| 2009/0007465 A1 | 1/2009 | Robl et al. |
| 2009/0282712 A1 | 11/2009 | Pruszynski |
| 2009/0311086 A1 | 12/2009 | Steig, Jr. et al. |
| 2010/0061799 A1 | 3/2010 | Hill |
| 2010/0067982 A1 * | 3/2010 | Hill ............................... 403/321 |
| 2010/0192425 A1 * | 8/2010 | Miller et al. .................... 37/468 |
| 2010/0232920 A1 | 9/2010 | Calvert et al. |
| 2011/0010915 A1 | 1/2011 | Calvert et al. |
| 2011/0091267 A1 | 4/2011 | Hill |
| 2011/0209608 A1 | 9/2011 | Stefek et al. |
| 2012/0093572 A1 * | 4/2012 | Lim et al. .......................... 403/31 |
| 2012/0210614 A1 * | 8/2012 | McCormick et al. ........... 37/468 |
| 2013/0000292 A1 | 1/2013 | Edler et al. |
| 2013/0008153 A1 | 1/2013 | Stefek et al. |
| 2013/0160268 A1 | 6/2013 | Parker et al. |
| 2013/0160269 A1 | 6/2013 | Parker et al. |
| 2013/0164080 A1 * | 6/2013 | Miller et al. .................. 403/327 |

FOREIGN PATENT DOCUMENTS

| | | |
|---|---|---|
| JP | 10082066 | 3/1998 |
| JP | 11181819 | 7/1999 |
| JP | 2000-1872 | 1/2000 |
| NZ | 233302 | 4/1990 |
| WO | 2011033253 | 3/2011 |

OTHER PUBLICATIONS

U.S. Patent Application of Troy C. Robl et al. entitled "Locking System for Quick Coupler" filed Apr. 2, 2013.

U.S. Patent Application of Troy Robl et al. entitled "Quick Coupler Hydraulic Control System" filed May 8, 2013.

U.S. Patent Application of Troy Curtis Robl et al. entitled "Tool Coupler Having a Modular Fram Construction" filed Jan. 25, 2013.

"Earth-moving—Quick Couplers—Safety", Draft International Standard ISO/DIS 13031, © International Organization for Standardization (2011).

U.S. Patent Application of Troy Curtis Robl et al. entitled "Tool Coupler System Having Multiple Pressure Sources", filed on May 30, 2012.

U.S. Patent Application of Troy Curtis Robl et al. entitled "Quick Coupler", filed on May 30, 2012.

U.S. Appl. No. 13/483,875 of Troy Curtis Robl et al. entitled "Tool Coupler System Having Multiple Pressure Sources" filed May 30, 2012.

U.S. Appl. No. 13/855,002 of Troy C. Robl et al. entitled "Locking System for Quick Coupler" filed Apr. 2, 2013.

U.S. Appl. No. 13/889,927 of Troy Robl et al. entitled "Quick Coupler Hydraulic Control System" filed May 8, 2013.

U.S. Appl. No. 13/750,394 of Troy Curtis Robl et al. entitled "Tool Coupler Having a Modular Frame Contruction" filed Jan. 25, 2013.

* cited by examiner

TOOL COUPLER HAVING ANTI-RELEASE MECHANISM

TECHNICAL FIELD

The present disclosure relates generally to a tool coupler and, more particularly, to a tool coupler having an anti-release mechanism.

BACKGROUND

A tool coupler can be used to increase the functionality and versatility of a host machine by allowing different tools to be quickly and interchangeably connected to linkage of the machine. Tool couplers generally include a frame connected to the linkage of a machine, and hooks that protrude from the frame in different directions. The hooks of the tool coupler engage corresponding pins of a tool to thereby connect the tool to the linkage.

Most tool couplers include a safety feature that inhibits undesired disengagement of the hooks from the pins. For example, a hydraulic piston filled with pressurized fluid is commonly used to maintain the hook/pin engagement. Although adequate for most conditions, the typical hydraulic piston may not always function as desired during a loss of pressure situation. That is, it may be possible for the tool coupler to become loose when no pressure is supplied to and/or maintained within the hydraulic piston.

The tool coupler of the present disclosure addresses one or more of the needs set forth above and/or other problems of the prior art.

SUMMARY

One aspect of the present disclosure is directed to a tool coupler. The tool coupler may include a coupler frame, a hook fixedly connected to the coupler frame and configured to receive a first pin of a tool, and a wedge slidingly received within the coupler frame. The tool coupler may also include an actuator connected to move the wedge away from the hook to bias a second pin of the tool against the coupler frame, and a latch associated with the wedge. The latch may be movable between a first position at which the wedge is allowed to move away from the second pin, and a second position at which the wedge is constrained from moving away from the second pin.

Another aspect of the present disclosure is directed to another tool coupler. This tool coupler may include a coupler frame, a hook fixedly connected to the coupler frame and configured to receive a first pin of a tool, and a wedge slidingly received within the coupler frame. The tool coupler may also include an actuator connected to move the wedge away from the hook to bias a second pin of the tool against the coupler frame, and a latch associated with the hook. The latch may be pivotal in a first direction from a first position at which the first pin is free to move relative to the hook, to a second position at which the first pin blocks a release path away from the hook. A disengaging movement of the first pin relative to the hook may bias the latch in the first direction.

DETAILED DESCRIPTION

Figure 1:
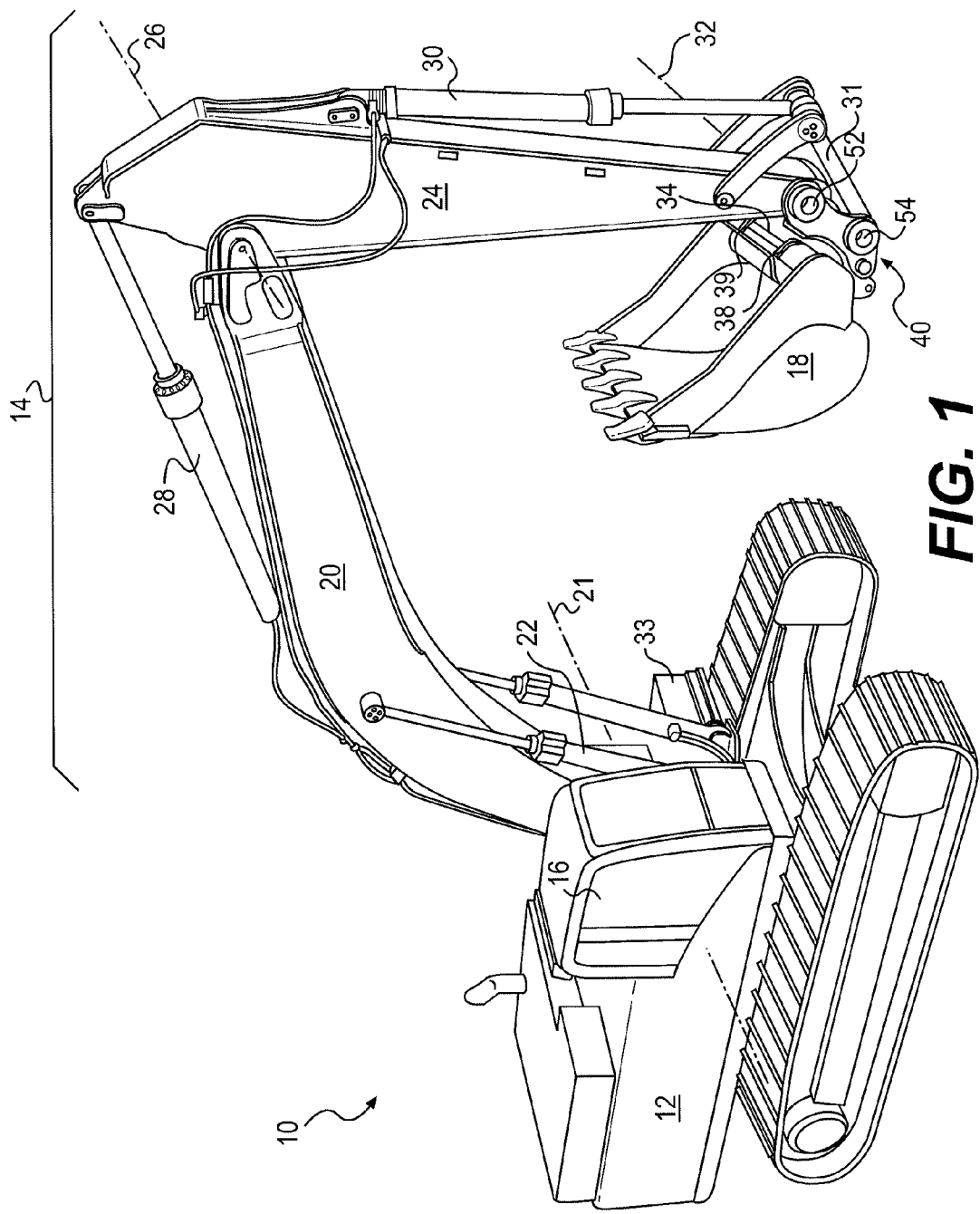
FIG. 1 is a pictorial illustration of an exemplary disclosed machine.

FIG. 1 illustrates an exemplary machine 10. Machine 10 may be a fixed or mobile machine that performs some type of operation associated with an industry, such as mining, construction, farming, transportation, or any other industry known in the art. For example, machine 10 may be an earth moving machine such as an excavator (shown in FIG. 1), a backhoe, a loader, or a motor grader. Machine 10 may include a power source 12, a tool system 14 driven by power source 12, and an operator station 16 situated for manual control of power source 12 and/or tool system 14.

Tool system 14 may include linkage acted on by hydraulic cylinders to move a tool 18. Specifically, tool system 14 may include a boom 20 that is vertically pivotal about a horizontal axis 21 (as viewed in FIG. 1) by a pair of adjacent, double-acting, hydraulic cylinders 22, and a stick 24 that is vertically pivotal about a horizontal axis 26 by a single, double-acting, hydraulic cylinder 28. Tool system 14 may further include a single, double-acting, hydraulic cylinder 30 that is connected to vertically pivot tool 18 about a horizontal axis 32. In one embodiment, hydraulic cylinder 30 may be connected at a head-end to a base portion of stick 24, and to tool 18 at an opposing rod-end by way of a power link 31. Boom 20 may be pivotally connected to a frame 33 of machine 10. Stick 24 may pivotally connect boom 20 to tool 18. It should be noted that other configurations of tool system 14 may also be possible.

Numerous different tools 18 may be attachable to a single machine 10 and controllable via operator station 16. Each tool 18 may include a device used to perform a particular task such as, for example, a bucket, a fork arrangement, a blade, a grapple, or any other task-performing device. Although connected in the embodiment of FIG. 1 to pivot relative to machine 10, tool 18 may additionally rotate, slide, swing, lift, or move in any other manner known in the art. Tool 18 may include fore- and aft-located tool pins 34, 36 (only pin 34 shown in FIG. 1) that facilitate connection to tool system 14. Tool pins 34, 36 may be joined at their ends by a pair of spaced apart tool brackets 38, 39 that are welded to an external surface of tool 18.

Figure 2:
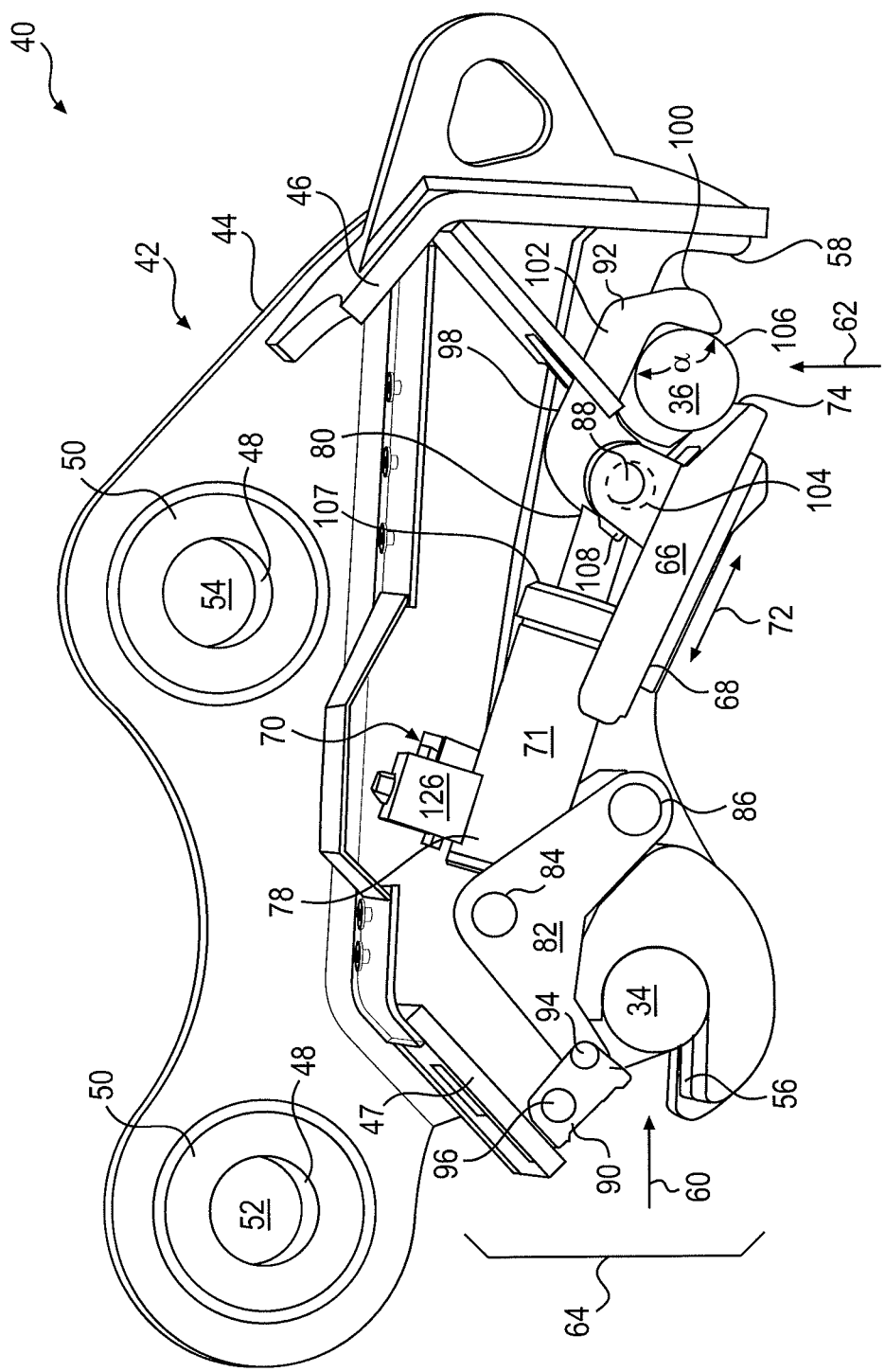
FIG. 2 is a cut-away illustration of an exemplary disclosed tool coupler that may be used with the machine of FIG. 1.
Figure 3:
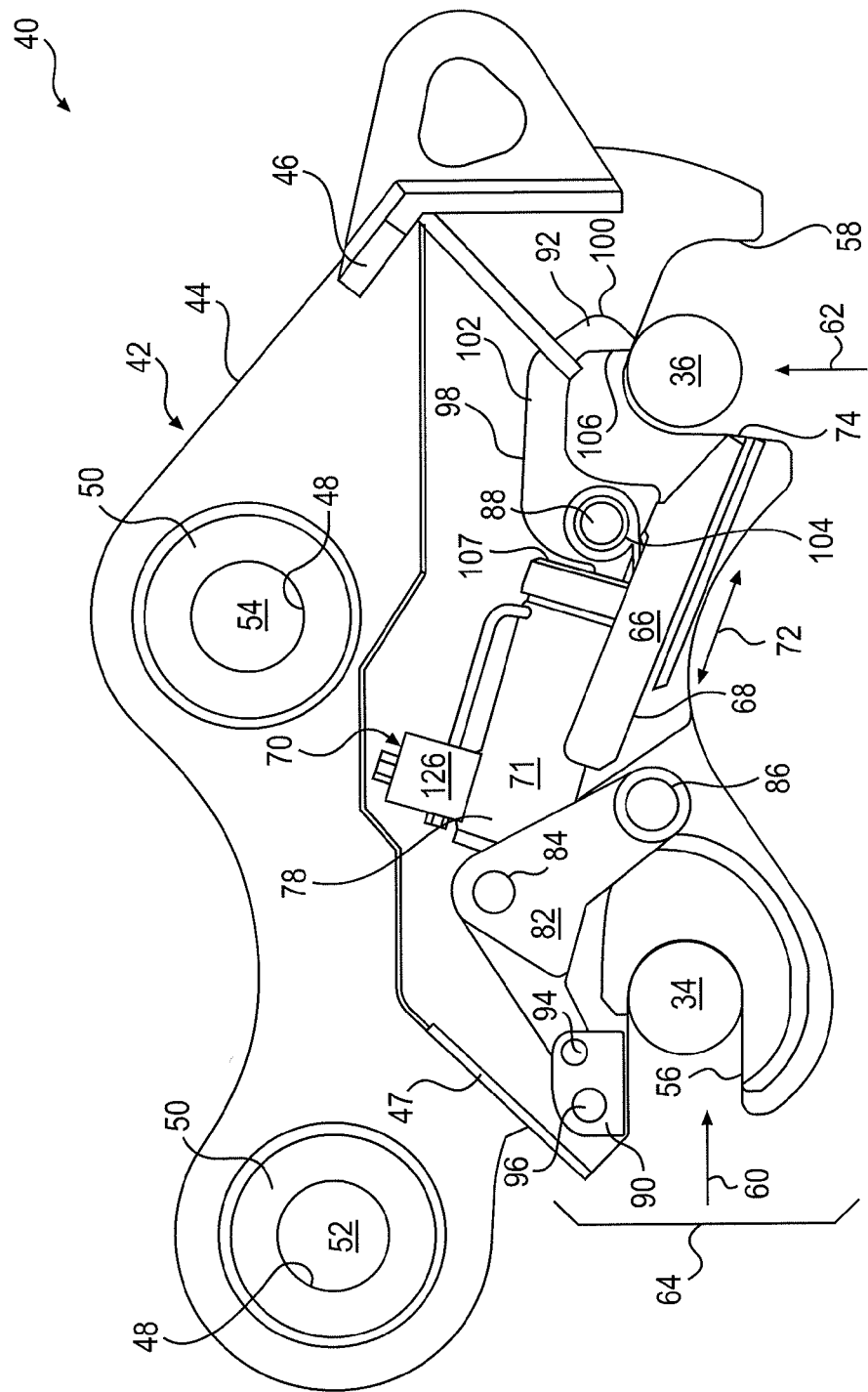
FIG. 3 is another cut-away illustration of the tool coupler of FIG. 2 shown in an alternative operating position.

A tool coupler 40 may be located to facilitate a quick connection between the linkage of tool system 14 and tool 18. As shown in FIGS. 2 and 3, tool coupler 40 may include a frame 42 having spaced-apart, parallel side plates 44 (one removed from FIG. 2 for clarity) that are interconnected at one end by a cross-plate 46 and at an opposing end by a cross-brace 47. Side plates 44 may each include two spaced apart pin openings 48, and corresponding collars 50 provided adjacent to each pin opening 48. Pin openings 48 in one side plate 44 may be substantially aligned with pin openings 48 in the opposing side plate 44, such that a first stick pin 52 of stick 24 and a second stick pin 54 of power link 31 may pass therethrough and be retained by side plates 44. In this manner, extension and retraction of hydraulic cylinder 30, acting through power link 31 and stick pin 54, may function to pivot tool coupler 40 about stick pin 52 in multiple directions.

Tool coupler 40 may be detachably connected to tool 18 at a side that is somewhat opposite the connection with stick 24 and power link 31. In the exemplary embodiment, each side plate 44 may include a rear-located, rear-facing hook 56 and a front-located, bottom-facing notch 58. Hook 56 and notch 58 may be fixedly connected to side plates 44 of frame 42. For the purposes of this disclosure the phrase fixedly connected may include bolted to, welded to, integrally formed with or otherwise rigidly adjoined to. Hook 56 and notch 58 may be configured to receive tool pins 34 and 36 in first and second generally-orthogonal directions represented by arrows 60 and 62, respectively. For example, tool coupler 40 may first be positioned such that hook 56 receives tool pin 34 in the direction of arrow 60, and then hydraulic cylinder 30 (referring to FIG. 1) may be extended to rotate tool coupler 40 in a clockwise direction (as viewed in FIG. 2) about tool pin 36 until notch 58 receives tool pin 36 in the direction of arrow 62.

Tool coupler 40 may be provided with a locking system 64 configured to bias first and/or second tool pins 34, 36 into hooks 56 and notches 58 of side plates 44, thereby locking tool 18 to tool coupler 40. Locking system 64 may include any number of interconnected and movable components. For example, locking system 64 may include a wedge 66 that is slidingly disposed within slots 68 of each side plate 44, and a hydraulic actuator 70 configured to move wedge 66 in a direction represented by an arrow 72. As hydraulic actuator 70 extends, wedge 66 may be forced toward and under tool pin 36, thereby causing a tapered end 74 of wedge 66 to engage tool pin 36. As wedge 66 is moved further toward tool pin 36, the inclined surface at tapered end 74 may bias tool pin 36 into notch 58 and against edges of side plates 44, thereby inhibiting reverse movement of tool pin 36 out of notch 58. The extended position of hydraulic actuator 70 and wedge 66 is shown in FIG. 2. The retracted position of hydraulic actuator 70 and wedge 66 is shown in FIG. 3.

Hydraulic actuator 70, in the disclosed exemplary embodiment, includes a hydraulic cylinder 71 having a head-end 78 and a rod-end 80. Head-end 78 may be connected to a pair of rocker assemblies 82. Rocker assemblies 82 may be generally V-shaped, each having a vertex and opposing first and second tip ends. The first tip end of each rocker assembly 82 may be pivotally connected to side plates 44 by way of a pin 86. Head end 78 of hydraulic cylinder 71 may be pivotally connected to the vertex of rocker assemblies 82 via a pin 84. Rod-end 80 of hydraulic cylinder may be pivotally connected to wedge 66 via another pin 88.

First and second latches 90, 92 may be associated with locking system 64 and function as anti-release mechanisms that inhibit undesired release of tool 18 from tool coupler 40. First latch 90 may be configured to lock tool pin 34 in place, and be pivotally connected to the second tip ends of rocker assemblies 82 generally opposite the pivotal connection of rocker assemblies 82 to side plates 44. A movable pivot pin 94 may connect first latch 90 to rocker assemblies 82, while a fixed pivot pin 96 may connect first latch 90 to side plates 44. As hydraulic cylinder 71 extends, head-end 78 may push the vertex of rocker assemblies 82 to pivot in a counterclockwise direction (as viewed in FIG. 2) about pivot pin 86, thereby moving pivot pin 94 and the distal tip of first latch 90 toward tool pin 34. As the distal tip of first latch 90 is moved downward by rocker assemblies 82 (relative to the orientation of FIG. 2), first latch 90 may rotate about fixed pivot pin 96 in a clockwise direction, thereby moving into a locked position and blocking a release path of tool pin 34 (i.e., blocking movement of tool pin 34 in opposition to arrow 60). When first latch 90 is in the locked position (shown in FIG. 2), a base end of first latch 90 at fixed pivot pin 96 may engage cross-brace 47 such that cross-brace 47 functions as an ends stop that inhibits further movement of first latch 90 in the clockwise direction. Movable pivot pin 94 may be located between fixed pivot pin 96 and tool pin 34, when first latch 90 is in the locked position. A retraction of hydraulic cylinder 71 may function to pivot first latch 90 in a counterclockwise direction out of the release path of tool pin 34 (shown in FIG. 3).

Second latch 92 may be associated with locking of tool pin 36, and have a base end 98 pivotally connected to wedge 66 and to hydraulic cylinder 71 at pin 88. Second latch 92 may be generally hook-shaped, and have a distal end 100 located opposite base end 98. Distal end 100 may extend downward toward tool pin 36 from a transverse middle portion 102 that connects base end 98 to distal end 100. In this configuration, as hydraulic cylinder 71 extends, rod-end 80 may push second latch 92 over the top of tool pin 36 until distal end 100 moves past a center of tool pin 36. Once distal end 100 moves past the center of tool pin 36, a biasing device 104 (e.g., a coil or torsion spring associated with pin 88) may bias distal end 100 downward at a far side of tool pin 36 until middle portion 102 rests on tool pin 36. At this location (shown in FIG. 2), second latch 92, together with wedge 66, may substantially encircle tool pin 36, thereby inhibiting undesired separation of wedge 66 from tool pin 36.

Distal end 100 of second latch 92 may have an internal surface 106 that is oriented at an oblique angle α (i.e., oblique relative to a movement of wedge 66 in the direction of arrow 72) designed to facilitate intentional unlocking of tool pin 36. In one embodiment, α may be an internal angle having a value in the range of about 95-115°. With this design, as hydraulic cylinder 71 retracts, tool pin 36 may engage internal surface 106 and the incline thereof may cause distal end 100 to slide upwards and over the top of tool pin 36, thereby allowing separation of wedge 66 from tool pin 36. Spring 104 may be designed such that, during non-digging movements of tool 18 and during failure conditions (e.g., when no or little pressure is maintained within hydraulic cylinder 71), unintended forces of tool pin 36 exerted on internal surface 106 will be insufficient to overcome the bias of spring 104, yet the intentional force of hydraulic cylinder 71 may cause distal end 100 to lift over the top of tool pin 36. In one embodiment, the constant of spring 104 may be about 150-250 lb/in.

Second latch 92 may have a hardness about the same as a hardness of tool pin 36 to inhibit deformation forming in second latch 92 due to engagement with tool pin 36. In one embodiment, the hardness of tool pin 36 and second latch 92 may be about Rockwell 35-37 C. Deformations within second latch 92 could increase a difficulty of sliding second latch 92 over tool pin 36 with hydraulic cylinder 71.

A full retraction of hydraulic cylinder 71 may result in complete removal of wedge 66 and second latch 92 from the release path of tool pin 36. In particular, as hydraulic cylinder 71 is retracted, a collar 107 of hydraulic cylinder 71 may engage a protrusion 108 at base end 98 of second latch 92. Protrusion 108 may act as a pivotable arm in this situation, generating a counterclockwise moment on second latch 92 (as viewed in FIG. 3) that causes distal end 100 to lift up above tool pin 36. Second latch 92 may be held in this open position as long as hydraulic actuator 70 is retracted, making tool coupler 40 ready to receive or release tool pin 36.

Figure 4:
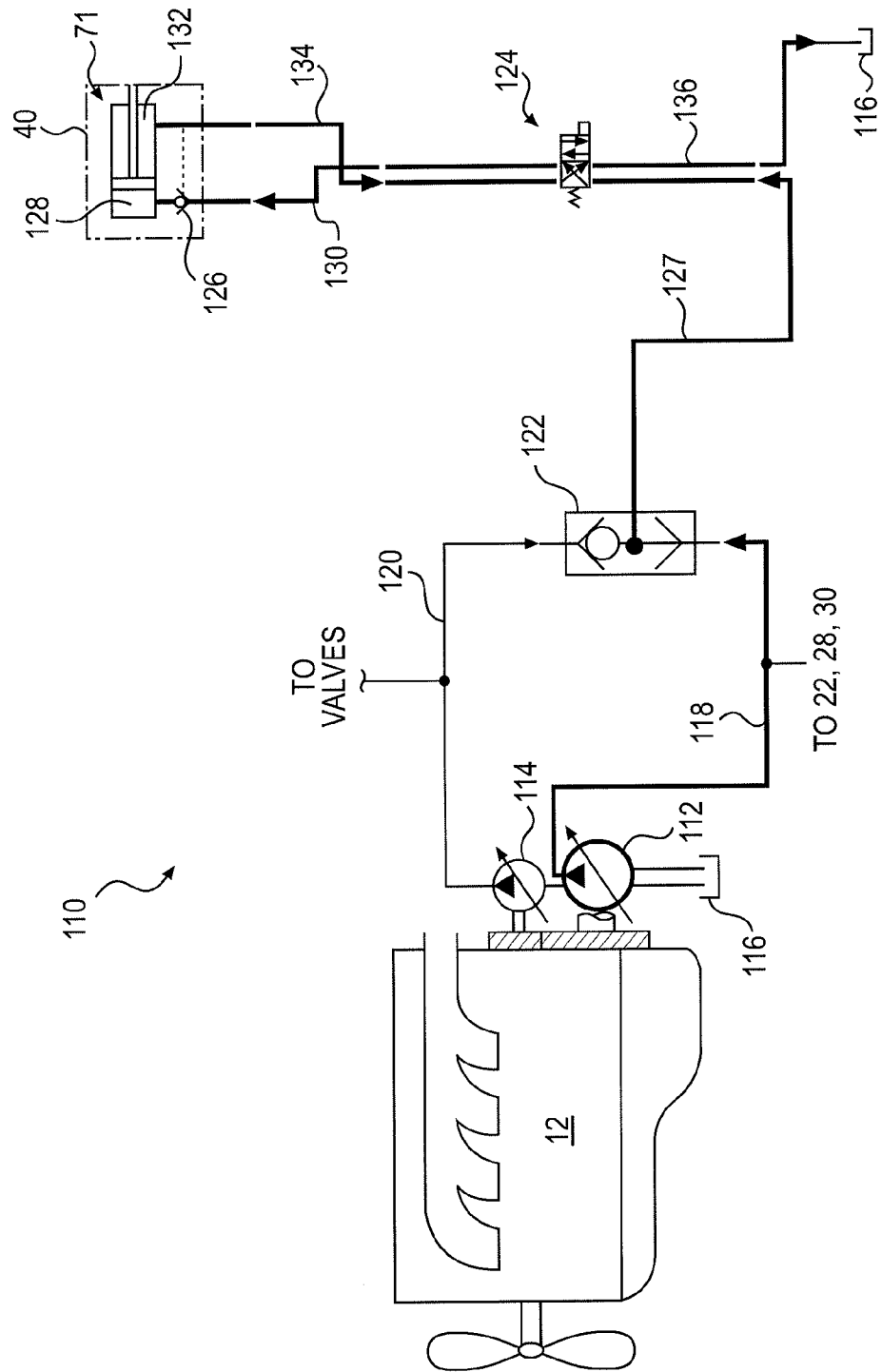
FIG. 4 is a schematic illustration of an exemplary disclosed hydraulic circuit associated with the tool coupler of FIG. 2.

As can be seen from the schematic of FIG. 4, tool coupler 40 may be part of a hydraulic system 110 that also includes power source 12. Hydraulic system 110 may include a primary pump 112 and a secondary pump 114 that are driven by power source 12 to draw fluid from a low-pressure reservoir 116 and pressurized the fluid for use by the various components of machine 10. In the disclosed exemplary embodiment, primary pump 112 may be one of two substantially identical implement pumps (only one shown) that provide hydraulic cylinders 22, 28, and/or 30 with high-pressurize fluid (e.g., fluid having a pressure of about 5,000-6,000 psi). In this same embodiment, secondary pump 114 may be a pilot pump configured to provide pilot fluid used to move various valves of machine 10 (e.g., boom, stick, and/or bucket control valves). Secondary pump 114 may pressurize fluid from low-pressure reservoir 116 to a much lower pressure than primary pump 112, for example by a factor of about ten. That is, secondary pump 114 may pressurize the fluid to about 500-600 psi.

Both of primary and secondary pumps 112, 114 may be variable-displacement, piston-type pumps that are driven by power source 12. Primary and secondary pumps 112, 114 may be drivably connected to power source 12 by, for example, a countershaft, a belt (not shown), an electrical circuit (not shown), or in another suitable manner. One or more check valves (not shown) may be disposed within discharge passages 118, 120 of primary and secondary pumps 112, 114, respectively, to provide for unidirectional flows of fluid through the pumps. It is contemplated, that primary and/or secondary pumps 112, 114 may alternatively be rotary types of pumps and/or have fixed displacements, if desired.

Hydraulic system 110 may also include valves used to control the flows of pressurized fluid from primary and secondary pumps 112, 114 to hydraulic cylinder 71 within tool coupler 40. For example, hydraulic system 110 may include a shuttle valve 122, a control valve 124, and a check valve 126 disposed in series between hydraulic cylinder 71 and primary and secondary pumps 112, 114. It should be noted that additional valves may be included within hydraulic system 110, if desired.

Shuttle valve 122 may be configured to selectively connect a higher-pressure fluid from primary and secondary pumps 112, 114 with control valve 124. For example, when the fluid being discharged from primary pump 112 has a pressure higher than a pressure of fluid being discharged from secondary pump 114, shuttle valve 122 may move to a first position (shown in FIG. 4) and connect discharge passage 118 with control valve 124. Similarly, when the fluid being discharged from secondary pump 114 has a pressure higher than a pressure of fluid being discharged from primary pump 112, shuttle valve 122 may move to a second position (shown in FIG. 5) and connect discharge passage 120 with control valve 124. The pressure of fluid from primary pump 112 may generally be much higher than the pressure of fluid from secondary pump 114 any time a hydraulic cylinder (e.g., one or more of hydraulic cylinders 22, 28, and 30) that draws fluid from primary pump 112 is operational. That is, the displacement of primary pump 112 may be controlled at least partially based on a demand for fluid by the operational hydraulic cylinders and, when the demand is present, primary pump 112 may discharge high-pressure fluid at a corresponding rate (shown in FIG. 4). In contrast, when the demand is low (e.g., when hydraulic cylinders 22, 28, and/or 30 are idle or inactive), primary pump 112 may be destroked and not discharge fluid at all (shown in FIG. 5). In this situation, secondary pump 114 may still be discharging fluid to the various valves of machine 10. Thus, the pressure of the fluid discharged by secondary pump 114 may be high enough to move shuttle valve 122 to the second position. It should be noted that, in the disclosed embodiment, the higher-pressure fluid from primary pump 112 (when primary pump 112 is discharging fluid) may be required to actuate hydraulic cylinder 71 (e.g., to extend or retract hydraulic cylinder 71), but the lower-pressure fluid from secondary pump 114 may be sufficient to maintain hydraulic cylinder 71 in an actuated position.

Figure 5:
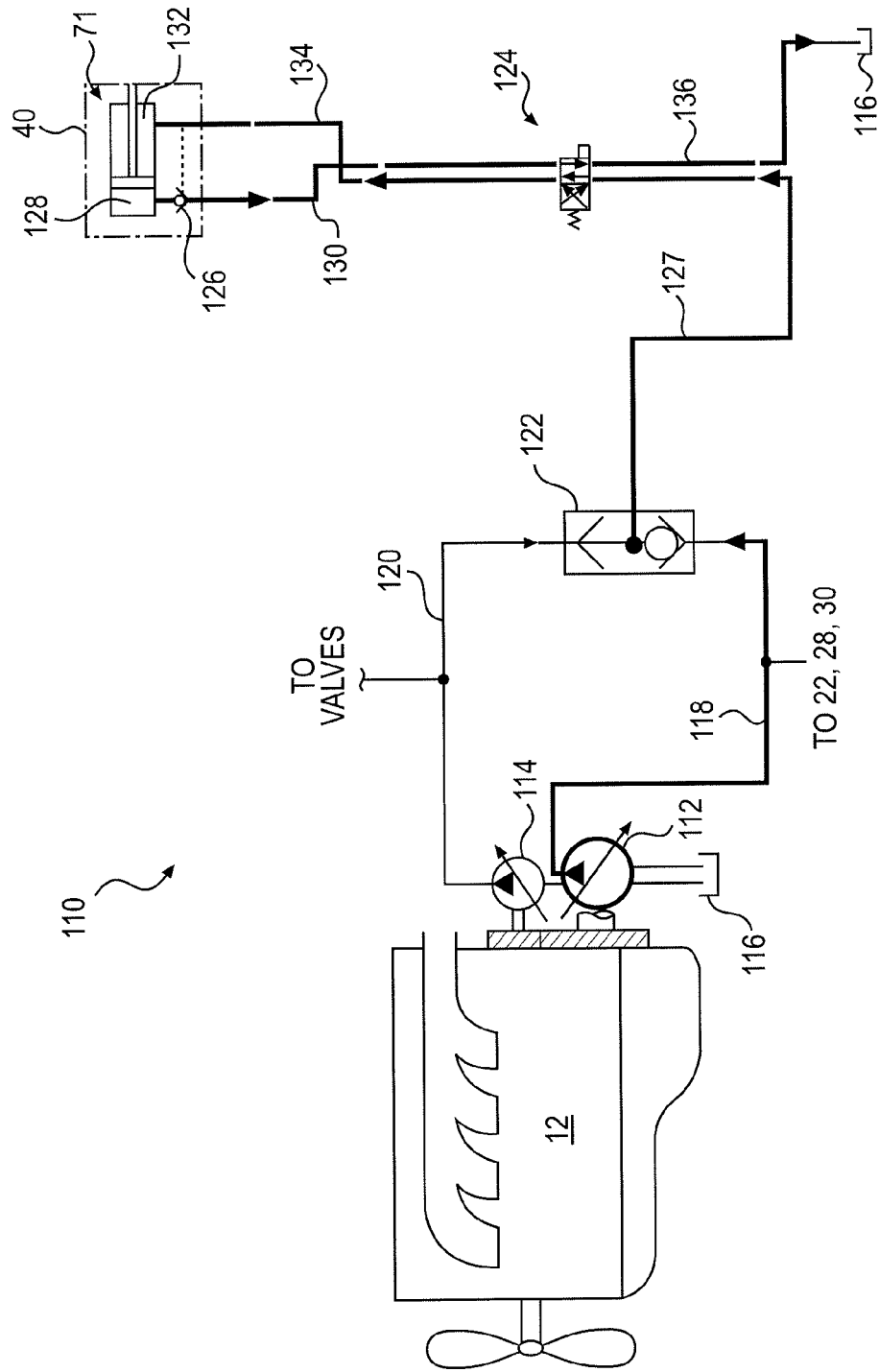
FIG. 5 if another schematic illustration of the hydraulic circuit of FIG. 4 shown in an alternative operating position.

Control valve 124 may receive the pressurized fluid from shuttle valve 122 via a supply passage 127 and selectively direct the pressurized fluid to either a head-end chamber 128 of hydraulic cylinder 71 via a head-end passage 130 (shown in FIG. 4) or to a rod-end chamber 132 via a rod-end passage 134 (shown in FIG. 5). At this same time, control valve 124 may selectively connect the other of the head- or rod-end chambers 128, 132 with low-pressure reservoir 116 via a drain passage 136. In the disclosed embodiment, control valve 124 may be a solenoid-operated, two-position valve, although other types of valves may alternatively be used in connection with hydraulic cylinder 71.

Check valve 126 may be associated with head-end chamber 128 and configured to allow fluid to exit head-end chamber 128 only when an intentional retraction of hydraulic cylinder 71 is desired. In particular, only when a flow of high-pressure fluid is directed from rod-end passage 134 to check valve 126, will check valve 126 move to allow fluid from within head-end chamber 128 to drain through head-end passage 130 and control valve 124 to low-pressure reservoir 116. That is, the high-pressure fluid from rod-end passage 134 may pass to check valve 126 and function to reduce a pressure difference across check valve 126, thereby allowing check valve 126 to open. better. Check valve 126 may normally allow pressurized fluid to flow from head-end passage 130 into head-end chamber 128. In this manner, check valve 126 may act as an additional safety mechanism (i.e., in addition to first and second latches 90, 92) that inhibits undesired release of tool 18 from tool coupler 40 via retraction of hydraulic cylinder 71.

INDUSTRIAL APPLICABILITY

The presently disclosed tool coupler may be applicable to a variety of machines to increase the functionality of the machines. For example, a single excavator may be used for moving dirt, rock and other material during the excavation operations. And during these operations, different implements may be required, such as a different size of bucket, an impact breaker, or a grapple. The disclosed tool coupler can be used to quickly change from one implement to another with ease, thus reducing the time during which the machine is unavailable for its intended purpose.

In operation, tool coupler 40 may first be attached to stick 24 of machine 10 (referring to FIG. 1). To achieve this attachment, an end of stick 24 and an end of power link 31 may be maneuvered between side plates 44 and into alignment with pin openings 48. Stick pins 52 and 54 may then be inserted into pin openings 48 to connect stick 24 and power link 31, respectively, to an upper portion of tool coupler 40. Locks (e.g., roll pins, cotter pins, or another type of pin or lock—not shown) may then be inserted through collars 50 and corresponding slots within stick pins 52 and 54, if desired, to lock stick pins 52 and 54 in place. In this manner, tool coupler 40 may be securely attached to an end of stick 24 throughout machine operation.

To attach a tool 18 to tool coupler 40, stick 24 may be maneuvered to a position at which tool coupler 40 is located above tool 18. Tool coupler 40 may then be oriented so that hook 56 is located to receive tool pin 34 (referring to FIG. 2). Tool coupler 40 may then be lowered onto tool 18 in the direction opposite arrow 60 so that tool pin 34 is seated within hook 56. Hydraulic cylinder 30 may next be activated to move power link 31 and thereby pivot tool coupler 40 about tool pin 34 such that notch 58 may be moved over tool pin 36. Notch 58 may then be seated onto tool pin 36 via movement of tool coupler 40 in a direction opposite arrow 62.

To lock tool pins 34, 36 within tool coupler 40, control valve 124 (referring to FIG. 3) may be moved to fill head-end chamber 128 with pressurized fluid while simultaneously draining rod-end chamber 132 (shown in FIG. 4), thereby extending hydraulic cylinder 71. As described above, the extension of hydraulic cylinder 71 may pivot rocker assemblies 82 in the counterclockwise direction about pin 86 (referring to the perspective of FIG. 2). This pivoting may cause first latch 90 to rotate about fixed pivot pin 96 in the clockwise direction and move into the release path of tool pin 34, thereby blocking tool pin 34 from retraction out of hook 56. Further extension of hydraulic cylinder 71 may function to slide wedge 66 under tool pin 36, thereby forcing tool pin 36 against side plates 44. As wedge 66 moves under tool pin 36, second latch 92 may be pushed over the top of tool pin 36 and fall into place on an outside of tool pin 36, thereby inhibiting movement of wedge 66 away from tool pin 36 (even if unintentional retraction of hydraulic cylinder 71 were to be facilitated). It should be noted that, although the extension of hydraulic cylinder 71 is described above as first causing latch 90 to rotate into the release path of tool pin 34 and then wedge 66 to slide under too pin 36, it is contemplated that this order may be reversed or that the operations may be performed simultaneously, if desired. It is further contemplated that the order of these operations may change over time through use of tool coupler 40.

From the locked state described above and shown in FIG. 2, tool 18 may only be removed from tool coupler 40 by intentional retraction of hydraulic cylinder 71. In particular, to initiate decoupling of tool 18, control valve 124 may move to direct pressurized fluid into rod-end chamber 132. The high-pressure fluid entering rod-end chamber 132 may act on check valve 128 to move it to its flow-passing position, thereby allowing the fluid within head-end chamber 128 to drain through control valve 124 to low-pressure reservoir 116. The pressurized fluid entering rod-end chamber 132, combined with the draining of fluid from head-end chamber 128, may cause hydraulic cylinder 71 to retract and pivot rocker assemblies 82 in the clockwise direction about pin 86 (with respect to the view of FIGS. 2 and 3). This pivoting may cause first latch 90 to rotate about fixed pivot pin 96 in the counterclockwise direction and move out of the release path of tool pin 34. The retraction of hydraulic cylinder 71 may also cause second latch 92 to rise up and over tool pin 36 and wedge 66 to simultaneously move out from under tool pin 36, thereby releasing tool pin 36. This unlocked state is shown in FIG. 3. Hydraulic cylinder 30 may then be retracted to move notch 58 off of tool pin 36 and pivot tool coupler 40 about tool pin 34. Hook 56 may then be pulled off of tool pin 36, thereby disengaging tool coupler 40 from tool 18.

The presently disclosed tool coupler may help maintain proper coupling of tool 18, even during a loss of pressure in hydraulic system 110. For example, tool 18 may be inhibited from loosening and removal from tool coupler 40 by first and second latches 90, 92. That is, even if hydraulic cylinder 71 was allowed to move in an uncontrolled and/or unpressurized manner (e.g., allowed to retract), first and second latches 90 and 92 may inhibit movement of tool pins 34 and 36 out of hook 56 and notch 58, respectively. In fact, the location and manner of operation of first latch 90 may be such that an unintentional movement of tool pin 34 may actually increase the security of tool pin 34 within hook 56. Namely, movement of tool pin 34 in a direction opposite arrow 60 may only serve to move first latch 90 further into its locked position against cross brace 47. In addition, second latch 92 may function to retain wedge 66 in its locked position under tool pin 36 until a significant intentional force is generated by hydraulic cylinder 71.

It will be apparent to those skilled in the art that various modifications and variations can be made to the tool coupler of the present disclosure without departing from the scope of the disclosure. Other embodiments will be apparent to those skilled in the art from consideration of the specification and practice of the tool coupler disclosed herein. It is intended that the specification and examples be considered as exemplary only, with a true scope of the disclosure being indicated by the following claims and their equivalent.

What is claimed is:

1. A tool coupler configured to couple to first and second pins of a tool, the tool coupler comprising:
   a coupler frame;
   a hook fixedly connected to the coupler frame and configured to receive the first pin of the tool;
   a wedge operatively slidingly received within the coupler frame;
   an actuator connected to move the wedge away from the hook to bias the second pin of the tool against the coupler frame;
   a latch associated with the wedge and movable between a first position at which the wedge is allowed to move away from the second pin, and a second position at which the wedge is constrained from moving away from the second pin; and
   a spring configured to bias the latch toward the second position, wherein the latch includes a base end pivotally connected to the wedge; and
   wherein a portion of the actuator is configured to selectively engage a protrusion at the base end of the latch and move the latch against the bias of the spring to the first position.

2. The tool coupler of claim 1, wherein the actuator is configured to engage the protrusion at the base end of the latch only when the actuator moves the wedge toward the hook.

3. The tool coupler of claim 1, wherein the latch is hook-shaped and includes a distal end configured to engage the second pin of the tool.

4. The tool coupler of claim 3, wherein:
   the latch includes a middle portion disposed between the base end and the distal end; and
   the middle portion is configured to rest on the second pin of the tool when the second pin is biased by the wedge against the coupler frame.

5. The tool coupler of claim 4, wherein, when the distal end engages the second pin of the tool, the wedge and the latch are together configured to substantially encircle the second pin of the tool.

6. The tool coupler of claim 3, wherein:
   the distal end includes an inner surface oriented toward the base end; and
   the inner surface is oriented at an oblique angle relative to a movement direction of the wedge within the coupler frame.

7. The tool coupler of claim 6, wherein the oblique angle is an internal angle having a value of about 95-115°.

8. The tool coupler of claim 6, wherein the wedge is slidably disposed within slots in the coupler frame.

* * * * *